(12) United States Patent
Harada et al.

(10) Patent No.: US 9,115,262 B2
(45) Date of Patent: Aug. 25, 2015

(54) COMPLEX INORGANIC COLORED PIGMENT WITH REDUCED ELUTION OF HEXAVALENT CHROMIUM THEREFROM

(71) Applicant: TOKAN MATERIAL TECHNOLOGY CO., LTD., Osaka-shi (JP)

(72) Inventors: Naoko Harada, Osaka (JP); Shuzo Mihara, Nakama (JP); Seiichi Kadooka, Osaka (JP); Hisashi Kamatani, Osaka (JP)

(73) Assignee: TOKAN MATERIAL TECHNOLOGY CO., LTD., Osaka-Shi (JP)

( * ) Notice: Subject to any disclaimer, the term of this patent is extended or adjusted under 35 U.S.C. 154(b) by 0 days.

(21) Appl. No.: 14/355,841

(22) PCT Filed: Nov. 2, 2012

(86) PCT No.: PCT/JP2012/078441
§ 371 (c)(1),
(2) Date: May 1, 2014

(87) PCT Pub. No.: WO2013/065813
PCT Pub. Date: May 10, 2013

(65) Prior Publication Data
US 2014/0251185 A1    Sep. 11, 2014

(30) Foreign Application Priority Data

Nov. 2, 2011    (JP) ................................. 2011-241024

(51) Int. Cl.
C09K 3/00    (2006.01)
C09C 1/40    (2006.01)
C09C 1/34    (2006.01)
C09C 1/22    (2006.01)
C09C 1/24    (2006.01)
C09C 1/04    (2006.01)
C09C 1/08    (2006.01)
C08K 3/00    (2006.01)

(52) U.S. Cl.
CPC ............. *C08K 3/0033* (2013.01); *C09C 1/34* (2013.01); *C09C 1/346* (2013.01); *C01P 2002/50* (2013.01); *C01P 2002/52* (2013.01); *C01P 2002/80* (2013.01); *C01P 2006/60* (2013.01); *C01P 2006/80* (2013.01)

(58) Field of Classification Search
CPC .............. C09K 3/00; C09C 1/40; C09C 1/34; C09C 1/22; C09C 1/24; C09C 1/04; C09C 1/08
See application file for complete search history.

(56) References Cited

U.S. PATENT DOCUMENTS

| 2,309,173 | A | | 1/1943 | Heinrich | |
|---|---|---|---|---|---|
| 5,167,708 | A | * | 12/1992 | Wilhelm et al. | ............... 106/453 |
| 5,250,112 | A | | 10/1993 | Wussow et al. | |
| 5,814,434 | A | * | 9/1998 | Nakamura et al. | ............... 430/25 |
| 2006/0182698 | A1 | | 8/2006 | Grizzo et al. | |
| 2010/0064942 | A1 | | 3/2010 | Detrie et al. | |
| 2010/0212552 | A1 | * | 8/2010 | Stratton et al. | ................. 106/712 |
| 2013/0048925 | A1 | * | 2/2013 | Edwards et al. | ............... 252/587 |

FOREIGN PATENT DOCUMENTS

| JP | 54-020996 | 2/1979 |
|---|---|---|
| JP | 61-122178 | 6/1986 |
| JP | 02-275814 | 11/1990 |
| JP | 05-254844 | 10/1993 |
| JP | 08-027393 | 1/1996 |
| JP | 2005-539122 | 12/2005 |

OTHER PUBLICATIONS

International Search Report for corresponding International Application No. PCT/JP2012/078441, Jan. 22, 2013.
Written Opinion for corresponding International Application No. PCT/JP2012/078441, Jan. 22, 2013.
Ganryo no Jiten, Sep. 25, 2000, pp. 213, 214, 257 to 262, 1st edition, 1st print, See Cite Nos. 11 & 12.

* cited by examiner

*Primary Examiner* — Pegah Parvini
(74) *Attorney, Agent, or Firm* — Mori & Ward, LLP

(57) ABSTRACT

The present invention provides a CICP that maintains high durability and excellent color properties inherent in chromium-containing CICP while allowing a reduced amount of hexavalent chromium elution from the pigment. The CICP with reduced elution of hexavalent chromium therefrom characterized in that the pigment consists of: a pigment component selected from the group consisting of Color Index (C.I.) Pigment Blue 36, C.I. Pigment Green 17, C.I. Pigment Green 51, C.I. Pigment Green 26, C.I. Pigment Yellow 162, C.I. Pigment Yellow 163, C.I. Pigment Red 233, C.I. Pigment Red 235, C.I. Pigment Red 236, C.I. Pigment Red 230, C.I. Pigment Brown 24, C.I. Pigment Brown 33, C.I. Pigment Brown 35, C.I. Pigment Brown 39, C.I. Pigment Brown 40, C.I. Pigment Brown 46, C.I. Pigment Black 27, C.I. Pigment Black 28, C.I. Pigment Brown 29, and C.I. Pigment Black 30; and an additive component in an amount of 0.1 to 5% by weight consisting of an oxide of at least one element selected from the group consisting of phosphorus, boron, tungsten, vanadium, magnesium, lithium and molybdenum.

2 Claims, No Drawings

COMPLEX INORGANIC COLORED PIGMENT WITH REDUCED ELUTION OF HEXAVALENT CHROMIUM THEREFROM

TECHNICAL FIELD

The present invention relates to chromium-containing Complex Inorganic Colored Pigment (hereinafter referred to as "CICP"), in which an amount of hexavalent chromium elution therefrom is reduced.

BACKGROUND ART

CICPs are colorants comprising a solid solution in which two or more oxides are combined. Since they have excellent weatherability, acid resistance, and heat resistance due to their extreme chemical and physical stability, the pigments are widely used in the applications that require durability such as paints, building materials, resin and the like.

CICP is composed of a combination of various oxides. Among them, chromium oxide provides various durability at higher levels, and a wide variety of color tones by combinations with other oxides. Therefore, various chromium-containing CICPs have been put to practical use, and used in a broad range of areas.

Chromium ion in a complex oxide is stable in the trivalent state. However, in recent years, there have been growing concerns about harmful effects on the environment and human health that a small amount of hexavalent chromium eluting from the chromium-containing CICP has, due to its toxic and carcinogenic properties. In EU member countries, for instance, the use of hazardous substances in electrical and electronic equipment has been restricted; any products having a hexavalent-chromium elution amount of over 1000 ppm cannot be put on the market The elution amount of hexavalent chromium from the chromium-containing CICP greatly varies depending on the chromium content, the types of co-existing materials in the solid solution, the calcination condition, the water rinse condition and the like. For instance, the elution amount of hexavalent chromium from Pigment Black 28 sometimes exceeds 1000 ppm.

To reduce the elution amount of hexavalent chromium from the chromium-containing CICP, a method of sufficiently rinsing the pigment with water, treating the pigment with a reducing agent such as sodium sulfite, or insolubilization by converting it into zinc chromate is commonly used. However, with the above-mentioned methods, the manufacturing process of the pigment is cumbersome and the elution of hexavalent chromium from the pigment cannot be satisfactorily reduced.

JP Publication of unexamined application No. 8-27393 discloses a process for reducing an elution amount of hexavalent chromium by bringing a pigment into contact with hydrated silica and a reducing substance in a slurry of chromium-containing CICP to treat the pigment with these substances. However, the process is cumbersome, and therefore not suited for manufacturing general-purpose products.

U.S. Pat. No. 2,309,173 discloses a black pigment of the copper-chromium type, obtained by adding 15% or less of an oxide of iron, nickel, cobalt, manganese, molybdenum, tungsten, vanadium or uranium to a mixture of copper oxide and chromium oxide, and then calcining the resulting mixture at a temperature of 800 to 1100° C. However, the black pigment that does not contain much manganese therein does not exhibit excellent blackness and tinting strength.

SUMMARY OF THE INVENTION

Problems to be Solved

In view of the foregoing problems, an object of the present invention is to provide a CICP that maintains high durability and excellent color properties inherent in chromium-containing CICP while allowing a reduced amount of hexavalent chromium elution from the pigment.

Means for Solving the Problems

The present inventors have found that addition of a particular oxide in a certain amount to the chromium-containing CICP leads to reducing greatly an amount of hexavalent chromium elution from the pigment to accomplish the present invention.

The present invention relates to a CICP with reduced elution of hexavalent chromium therefrom characterized in that the pigment comprising: a pigment component selected from the group consisting of Colour Index (C.I.) Pigment Blue 36, C.I. Pigment Green 17, C.I. Pigment Green 51, C.I. Pigment Green 26, C.I. Pigment Yellow 162, C.I. Pigment Yellow 163, C.I. Pigment Red 233, C.I. Pigment Red 235, C.I. Pigment Red 236, C.I. Pigment Red 230, C.I. Pigment Brown 24, C.I. Pigment Brown 33, C.I. Pigment Brown 35, C.I. Pigment Brown 39, C.I. Pigment Brown 40, C.I. Pigment Brown 46, C.I. Pigment Black 27, C.I. Pigment Black 28, C.I. Pigment Black 30, and C.I. Pigment Brown 29; and an additive component in an amount of 0.1 to 5% by weight comprising an oxide of at least one element selected from the group consisting of phosphorus, boron, tungsten, vanadium, magnesium, lithium and molybdenum.

Colour Index (C.I.) used herein is defined by "The Society of Dyers and Colourists (SDC)" and "The American Association of Textile Chemists and Colorists (AATTC)".

The pigment component to be used is preferably C.I. Pigment Black 28, C.I. Pigment Brown 33, C.I. Pigment Blue 36, C.I. Pigment Green 17, C.I. Pigment Brown 24, C.I. Pigment Black 27, or C.I. Pigment Brown 29, and more preferably C.I. Pigment Black 28 containing an oxide of manganese.

C.I. Pigment Black 28 containing an oxide of manganese preferably comprises 10 to 40% by weight of copper oxide, 10 to 70% by weight of chromium oxide, and 1 to 70% by weight of manganese oxide.

The additive component is preferably vanadium oxide, and more preferably vanadium pentoxide.

The amount of the additive component is desirably 0.1 to 5% by weight in the CICP with reduced elution of hexavalent chromium. An additive amount of less than 0.1% by weight fails to reduce the elution amount of hexavalent chromium from the pigment effectively, while an additive amount of more than 5% by weight greatly affects the original color tone in an adverse way. The proportion of the additive component is more preferably 1 to 5% by weight.

The embodiment of the present invention will be given hereinafter.

As raw materials of the pigment component, manganese compounds, chromium compounds, copper compounds, aluminum compounds, cobalt compounds, iron compounds, zinc compounds, titanium compounds, antimony compounds, and the like are prepared. As raw materials of the additive component, phosphorus compounds, boron compounds, tungsten compounds, vanadium compounds, magnesium compounds, lithium compounds, and molybdenum compounds are prepared. Any raw materials may be used as long as they are compounds containing the above-mentioned metal elements. These compounds may be hydroxides, oxides, carbonates, or oxalates, or may be a combination thereof.

The manufacturing process may be a commonly used one, mainly comprising a step of mixing the raw materials, a step of calcining the mixture, and a step of grinding the calcined product.

Mixing the raw materials may be carried out in either of two ways: dry process and wet process. In the case of the dry process, the raw materials are sufficiently mixed using a dry mixer such as a Henschel mixer until they are homogeneously mixed. In the case of the wet process, water is added to the appropriately measured raw materials to mix them in a ball mill and the like, and then the resulting slurry is dried. The raw material preparation may also be carried out by solution-phase synthesis such as co-precipitation.

In the step of calcining the mixture, the resulting mixture is calcined as it is at 800 to 1200° C. for about 2 to 6 hours for formation of a solid solution and crystallization. Too high calcining temperature causes excessive grain growth, while too low calcining temperature causes a defect such as insufficient color development or uneven calcination.

The resulting calcined product is commonly subjected to grain size adjustment by grinding. Any grinding process may be carried out as long as pigments with a desired grain size are obtained, and either of dry and wet grinding processes commonly used is applicable. Examples of mills in the case of dry grinding include atomizers and jet mills, while examples of mills in the case of wet grinding include ball mills, vibrating mills, and medium-agitating mills. In the case of the wet grinding, the slurry formed by grinding is sufficiently dried to obtain the intended products.

Advantageous Effects of the Invention

According to the present invention, addition of a particular oxide in a certain amount to the chromium-containing CICP leads to maintaining high durability and excellent color properties inherent in chromium-containing CICPs, while allowing a greatly reduced amount of hexavalent chromium elution from the pigment. The pigments according to the present invention are obtainable by a simple manufacturing process and usable as general-purpose products.

MODE FOR CARRYING OUT THE INVENTION

Examples of the present invention and Comparative Examples for comparison with the Examples of the invention will be given to illustrate the present invention.

Unless otherwise indicated, "%" and "ppm" in the Examples and Comparative Examples are given by weight.

Example 1

First, 30 g of copper oxide, 33 g of chromium oxide, 35 g of manganese oxide, and 2 g of vanadium pentoxide were sufficiently mixed in a Henschel mixer to form a homogeneous mixture. Next, the mixture was calcined at 800° C. for 6 hours to crystallize and develop black color. Then, 20 g of the resulting calcined product, 90 g of glass beads as grinding media, and 40 g of water were put in a bottle having a volume of 140 cc, and the calcined product in the bottle was ground using a paint conditioner for 30 minutes. After the glass beads were removed, the ground product was dried at approximately 100° C. for about 4 hours, thereby resulting in the preparation of C.I. Pigment Black 28 containing vanadium.

Example 2

C.I. Pigment Black 28 containing phosphorus was prepared carrying out the same procedure as in Example 1, with the exception that 2% by weight of ammonium phosphate was used in place of vanadium pentoxide in Example 1.

Example 3

C.I. Pigment Black 28 containing boron was prepared carrying out the same procedure as in Example 1, with the exception that 2% by weight of boric acid was used in place of vanadium pentoxide in Example 1.

Example 4

C.I. Pigment Black 28 containing tungsten was prepared carrying out the same procedure as in Example 1, with the exception that 2% by weight of ammonium paratungstate was used in place of vanadium pentoxide in Example 1.

Example 5

C.I. Pigment Black 28 containing magnesium was prepared carrying out the same procedure as in Example 1, with the exception that 2% by weight of magnesium chloride was used in place of vanadium pentoxide in Example 1.

Example 6

C.I. Pigment Black 28 containing lithium was prepared carrying out the same procedure as in Example 1, with the exception that 2% by weight of lithium carbonate was used in place of vanadium pentoxide in Example 1.

Example 7

C.I. Pigment Black 28 containing molybdenum was prepared carrying out the same procedure as in Example 1, with the exception that 2% by weight of ammonium molybdate was used in place of vanadium pentoxide in Example 1.

Example 8

First, 65 g of iron oxide, 25 g of chromium oxide, 8 g of zinc oxide, and 2 g of vanadium pentoxide were sufficiently mixed in a Henschel mixer to form a homogeneous mixture. Next, the mixture was calcined at 800° C. for about 6 hours to crystallize and develop brown color. The resulting calcined product was ground and then dried in the same manner as in Example 1, thereby resulting in the preparation of C.I. Pigment Brown 33 containing vanadium.

Example 9

First, 40 g of aluminum oxide, 38 g of cobalt oxide, 20 g of chromium oxide, and 2 g of vanadium pentoxide were sufficiently mixed in a Henschel mixer to form a homogeneous mixture. Next, the mixture was calcined at 1260° C. for about 6 hours to crystallize and develop blue color. The resulting calcined product was ground and then dried in the same manner as in Example 1, thereby resulting in the preparation of C.I. Pigment Blue 36 containing vanadium.

Example 10

First, 90 g of chromium oxide, 20 g of iron oxide, and 2 g of vanadium pentoxide were sufficiently mixed in a Henschel mixer to form a homogeneous mixture. Next, the mixture was calcined at 1000° C. for about 6 hours to crystallize and develop black color. The resulting calcined product was ground and then dried in the same manner as in Example 1, thereby resulting in the preparation of C.I. Pigment Green 17 containing vanadium.

Example 11

First, 75 g of titanium oxide, 10 g of antimony oxide, 15 g of chromium oxide, and 2 g of vanadium pentoxide were sufficiently mixed in a Henschel mixer to form a homogeneous mixture. Next, the mixture was calcined at 1000° C. for about 6 hours to crystallize and develop brown color. The resulting calcined product was ground and then dried in the same manner as in Example 1, thereby resulting in the preparation of C.I. Pigment Brown 24 containing vanadium.

Example 12

First, 45 g of iron oxide, 30 g of cobalt oxide, 23 g of chromium oxide, and 2 g of vanadium pentoxide were sufficiently mixed in a Henschel mixer to forma homogeneous mixture. Next, the mixture was calcined at 1000° C. for about 6 hours to crystallize and develop black color. The resulting calcined product was ground and then dried in the same manner as in Example 1, thereby resulting in the preparation of C.I. Pigment Black 27 containing vanadium.

Example 13

First, 80 g of iron oxide, 20 g of chromium oxide, and 2 g of vanadium pentoxide were sufficiently mixed in a Henschel mixer to form a homogeneous mixture. Next, the mixture was calcined at 1000° C. for about 6 hours to crystallize and develop black color. The resulting calcined product was ground and then dried in the same manner as in Example 1, thereby resulting in the preparation of C.I. Pigment Brown 29 containing vanadium.

Comparative Example 1

C.I. Pigment Black 28 was prepared carrying out the same procedure as in Example 1, with the exception that vanadium pentoxide, which is a raw material of the additive component, was not added to the pigment component.

Comparative Example 2

C.I. Pigment Brown 33 was prepared carrying out the same procedure as in Example 8, with the exception that vanadium pentoxide, which is a raw material of the additive component, was not added to the pigment component.

Comparative Example 3

C.I. Pigment Blue 36 was prepared carrying out the same procedure as in Example 9, with the exception that vanadium pentoxide, which is a raw material of the additive component, was not added to the pigment component.

Comparative Example 4

C.I. Pigment Green 17 was prepared carrying out the same procedure as in Example 10, with the exception that vanadium pentoxide, which is a raw material of the additive component, was not added to the pigment component.

Comparative Example 5

C.I. Pigment Brown 24 was prepared carrying out the same procedure as in Example 11, with the exception that vanadium pentoxide, which is a raw material of the additive component, was not added to the pigment component.

Comparative Example 6

C.I. Pigment Black 27 was prepared carrying out the same procedure as in Example 12, with the exception that vanadium pentoxide, which is a raw material of the additive component, was not added to the pigment component.

Comparative Example 7

C.I. Pigment Brown 29 was prepared carrying out the same procedure as in Example 13, with the exception that vanadium pentoxide, which is a raw material of the additive component, was not added to the pigment component.

Characteristic Evaluation (a) Measurement of the Elution Amount of Hexavalent Chromium Hexavalent chromium eluates from the CICPs obtained in the Examples and Comparative Examples were prepared based on a method according to EPA3060A (ALKALINE DIGESTION FOR HEXAVALENT CHROMIUM). Concentrations of hexavalent chromium in the eluates were measured using diphenylcarbazide absorptiometry. (Japanese Industrial Standards (JIS) K 0102)

(b) Color Tone

Each of 10 parts by weight of the CICPs obtained in the Examples and Comparative Examples with respect to 100 parts by weight of acrylic resin was dispersed using a paint conditioner. Next, each of the resulting coating compositions was developed on a white color paper, using a 150-μm-applicator. After drying, the color of each coating was measured using a spectrophotometer (CIE illuminant C, 2 degrees observer). To evaluate these results, the colorimetric measurements according to the CIELAB color system were given.

Comparative Example 1 was given to compare with Examples 1 to 7. Comparative Example 2 was given to compare with Example 8, Comparative Example 3 with Example 9, Comparative Example 4 with Example 10, Comparative Example 5 with Example 11, Comparative Example 6 with Example 12, and Comparative Example 7 with Example 13. Colour Index Generic Name used in each of the Examples and that used in the corresponding Comparative Example were the same. Color difference ΔE between the color tone of the pigment obtained in each of the Examples and that of the pigment obtained in the corresponding Comparative Example was determined.

TABLE 1 and TABLE 2 show the evaluation results.

TABLE 1

| | Colour Index Generic Name | Composition | Additive | Amount of Additive (wt. %) | $Cr^{6+}$ Elution Concentration (ppm) | Color Difference ΔE |
|---|---|---|---|---|---|---|
| Ex. 1 | Pigment Black 28 | Cu-Cr-Mn-V | Vanadium Pentoxide | 2 | 270 | 0.8 |

TABLE 1-continued

| | Colour Index Generic Name | Composition | Additive | Amount of Additive (wt. %) | $Cr^{6+}$ Elution Concentration (ppm) | Color Difference $\Delta E$ |
|---|---|---|---|---|---|---|
| Ex. 2 | Pigment Black 28 | Cu-Cr-Mn-P | Ammonium Phosphate | 2 | 400 | 0.4 |
| Ex. 3 | Pigment Black 28 | Cu-Cr-Mn-B | Boric Acid | 2 | 700 | 0.7 |
| Ex. 4 | Pigment Black 28 | Cu-Cr-Mn-W | Ammonium Paratungstate | 2 | 330 | 0.2 |
| Ex. 5 | Pigment Black 28 | Cu-Cr-Mn-Mg | Magnesium Chloride | 2 | 480 | 0.3 |
| Ex. 6 | Pigment Black 28 | Cu-Cr-Mn-Li | Lithium Carbonate | 2 | 890 | 0.5 |
| Ex. 7 | Pigment Black 28 | Cu-Cr-Mn-Mo | Ammonium Molybdate | 2 | 300 | 0.7 |
| Ex. 8 | Pigment Brown 33 | Fe-Zn-Cr-V | Vanadium Pentoxide | 2 | 13 | 9.6 |
| Ex. 9 | Pigment Blue 36 | Co-Al-Cr-V | Vanadium Pentoxide | 2 | <5 | 16.4 |
| Ex. 10 | Pigment green 17 | Cr-Fe-V | Vanadium Pentoxide | 2 | 42 | 3.2 |
| Ex. 11 | Pigment Brown 24 | Ti-Sb-Cr-V | Vanadium Pentoxide | 2 | <5 | 5.5 |
| Ex. 12 | Pigment Black 27 | Co-Fe-Cr-V | Vanadium Pentoxide | 2 | 34 | 2.1 |
| Ex. 13 | Pigment Brown 29 | Fe-Cr-V | Vanadium Pentoxide | 2 | 28 | 1.5 |

TABLE 2

| | Colour Index Generic Name | Composition | Additive | Amount of Additive (wt. %) | $Cr^{6+}$ Elution Concentration (ppm) | Color Difference $\Delta E$ |
|---|---|---|---|---|---|---|
| Com. Ex. 1 | Pigment Black 28 | Cu-Cr-Mn | — | — | 3000 | — |
| Com. Ex. 2 | Pigment Brown 33 | Fe-Zn-Cr | — | — | 162 | — |
| Com. Ex. 3 | Pigment Blue 36 | Co-Al-Cr | — | — | 117 | — |
| Com. Ex. 4 | Pigment Green 17 | Cr-Fe | — | — | 541 | — |
| Com. Ex. 5 | Pigment Brown 24 | Ti-Sb-Cr | — | — | 11 | — |
| Com. Ex. 6 | Pigment Black 27 | Co-Fe-Cr | — | — | 356 | — |
| Com. Ex. 7 | Pigment Brown 29 | Fe-Cr | — | — | 221 | — |

TABLE 1 and TABLE 2 show that each pigment of Examples 1 to 13 maintains high durability and excellent color properties inherent in chromium-containing CICP while allowing a greatly reduced amount of hexavalent chromium elution from the pigment.

The invention claimed is:

1. A complex inorganic colored pigment (CICP) with reduced elution of hexavalent chromium therefrom characterized in that the pigment comprises:
    a pigment component comprising Colour Index (CI.) Pigment Black 28 containing manganese oxide comprising 10 to 40% by weight of copper oxide, 10 to 70% by weight of chromium oxide, and 1 to 70% by weight of manganese oxide; and
    an additive component in an amount of 0.1 to 5% by weight comprising an oxide of at least one element selected from the group consisting of phosphorus, boron, tungsten, vanadium, magnesium, lithium and molybdenum.

2. A complex inorganic colored pigment (CICP) with reduced elution of hexavalent chromium therefrom characterized in that the pigment comprises:
    a pigment component comprising Colour Index (C.I.) Pigment Black 28 containing manganese oxide comprising 10 to 40% by weight of copper oxide, 10 to 70% by weight of chromium oxide, and 1 to 70% by weight of manganese oxide; and
    an additive component in an amount of 0.1 to 5% by weight comprising vanadium oxide.

* * * * *